US012749762B2

(12) United States Patent
Ito

(10) Patent No.: US 12,749,762 B2

(45) Date of Patent: Sep. 29, 2026

(54) BATTERY PACK INCLUDING VALVE STRUCTURE HAVING VALVE MEMBER BIASED TOWARD INNER SURFACE OF PACK CASE BY BIASING MEMBER

(71) Applicant: Prime Planet Energy & Solutions, Inc., Tokyo (JP)

(72) Inventor: Tomoaki Ito, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 592 days.

(21) Appl. No.: 18/172,330

(22) Filed: Feb. 22, 2023

(65) Prior Publication Data

US 2023/0275310 A1 Aug. 31, 2023

(30) Foreign Application Priority Data

Feb. 25, 2022 (JP) ................................ 2022-028192

(51) Int. Cl.

| | |
|---|---|
| ***H01M 50/333*** | (2021.01) |
| ***F16K 17/04*** | (2006.01) |
| ***H01M 10/0525*** | (2010.01) |
| ***H01M 50/209*** | (2021.01) |

(52) U.S. Cl.

CPC ....... *H01M 50/333* (2021.01); *F16K 17/0413* (2013.01); *F16K 17/0493* (2013.01); *H01M 10/0525* (2013.01); *H01M 50/209* (2021.01); *H01M 2200/20* (2013.01)

(58) Field of Classification Search

CPC ............. H01M 50/333; H01M 50/209; H01M 10/0525; F16K 17/0413; F16K 17/0493

USPC ............................................. 429/53, 54, 55

See application file for complete search history.

(56) References Cited

U.S. PATENT DOCUMENTS

| | | | |
|---|---|---|---|
| 2010/0047673 A1 | 2/2010 | Hirakawa et al. |
| 2020/0176741 A1 | 6/2020 | Kang et al. |
| 2022/0223970 A1 | 7/2022 | Okabayashi |

FOREIGN PATENT DOCUMENTS

| | | | | |
|---|---|---|---|---|
| CN | 113875080 | A | | 12/2021 |
| JP | S60245883 | A | | 12/1985 |
| JP | 2000149887 | A | * | 5/2000 |
| JP | 2008117756 | A | | 5/2008 |
| JP | 2019-086323 | A | | 6/2019 |
| JP | 202021897 | A | | 2/2020 |
| JP | 2020522105 | A | | 7/2020 |
| JP | 2022072035 | A | * | 5/2022 |

* cited by examiner

*Primary Examiner* — Sean P Cullen

(74) *Attorney, Agent, or Firm* — HAUPTMAN HAM, LLP

(57) ABSTRACT

A battery pack includes: a battery cell; a pack case that accommodates the battery cell and that is provided with an opening; and a valve structure provided to open and close the opening. The valve structure includes a valve member having a valve body portion fitted to an inner peripheral surface of the opening, and a biasing member provided inside the pack case. When an internal pressure of the pack case is increased, the valve member is moved to an outer side of the pack case so as to form a clearance between an outer peripheral surface of the valve body portion and the inner peripheral surface of the opening, and the biasing member biases the valve member toward an inner side of the pack case.

8 Claims, 5 Drawing Sheets

BATTERY PACK INCLUDING VALVE STRUCTURE HAVING VALVE MEMBER BIASED TOWARD INNER SURFACE OF PACK CASE BY BIASING MEMBER

This nonprovisional application is based on Japanese Patent Application No. 2022-028192 filed on Feb. 25, 2022 with the Japan Patent Office, the entire contents of which are hereby incorporated by reference.

BACKGROUND OF THE INVENTION

Field of the Invention

The present technology relates to a battery pack.

Description of the Background Art

There has been known a battery pack having a case in which a plurality of battery cells are accommodated. It has been also a conventional practice that when an internal pressure of the case is increased, a safety valve is opened to adjust the internal pressure. Examples of a structure of such a safety valve are illustrated in, for example, Japanese Patent Laying-Open No. 2020-021897, Japanese Patent Laying-Open No. 2008-117756, Japanese Patent Laying-Open No. 60-245883, and Japanese National Patent Publication No. 2020-522105.

SUMMARY OF THE INVENTION

When opening the safety valve, it is required not to excessively increase the internal pressure of the case and is required to appropriately adjust a flow velocity of gas ejected from inside of the case. The conventional structure of the safety valve cannot necessarily address such requirements sufficiently.

It is an object of the present technology to provide a battery pack in which highly reliable pressure adjustment and ejection velocity adjustment can be performed when an internal pressure is increased.

A battery pack according to the present technology includes: a battery cell; a pack case that accommodates the battery cell and that is provided with an opening; and a valve structure provided to open and close the opening. The valve structure includes a valve member having a valve body portion fitted to an inner peripheral surface of the opening, and a biasing member provided inside the pack case. When an internal pressure of the pack case is increased, the valve member is moved to an outer side of the pack case so as to form a clearance between an outer peripheral surface of the valve body portion and the inner peripheral surface of the opening, and the biasing member biases the valve member toward an inner side of the pack case.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
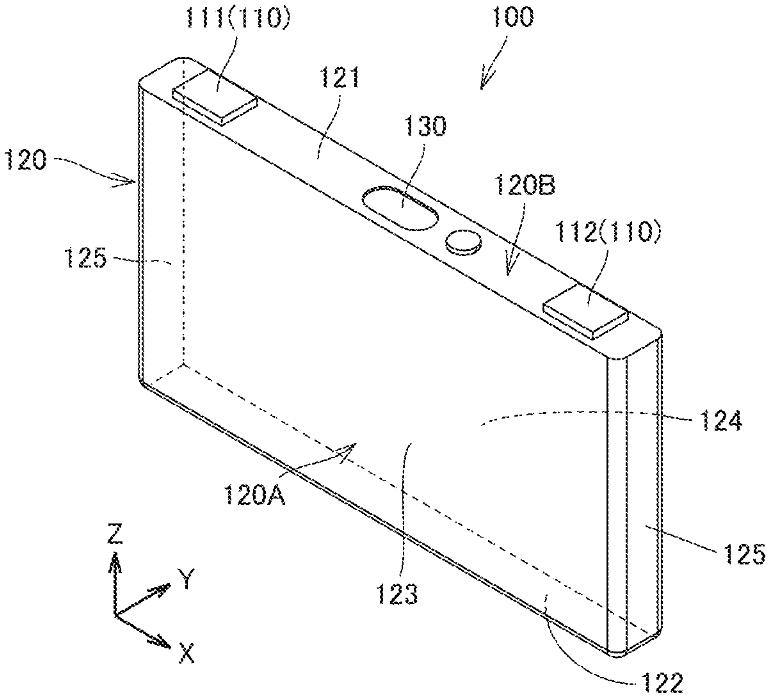
FIG. 1 is a perspective view showing a battery cell.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms “comprise”, “include”, and “have” are open-end terms. That is, when a certain configuration is included, a configuration other than the foregoing configuration may or may not be included.

Also, in the present specification, when geometric terms and terms representing positional/directional relations are used, for example, when terms such as “parallel”, “orthogonal”, “obliquely at 45°”, “coaxial”, and “along” are used, these terms permit manufacturing errors or slight fluctuations. In the present specification, when terms representing relative positional relations such as “upper side” and “lower side” are used, each of these terms is used to indicate a relative positional relation in one state, and the relative positional relation may be reversed or turned at any angle in accordance with an installation direction of each mechanism (for example, the entire mechanism is reversed upside down).

In the present specification, the term “battery” is not limited to a lithium ion battery, and may include another battery such as a nickel-metal hydride battery.

FIG. 1 is a perspective view showing a battery cell 100. As shown in FIG. 1, battery cell 100 has a prismatic shape. Battery cell 100 has electrode terminals 110, a housing 120, and a gas-discharge valve 130.

Electrode terminals 110 are formed on housing 120. Electrode terminals 110 have a positive electrode terminal 111 and a negative electrode terminal 112 arranged side by side along an X axis direction (second direction) orthogonal to a Y axis direction (first direction). Positive electrode terminal 111 and negative electrode terminal 112 are provided to be separated from each other in the X axis direction.

Housing 120 has a rectangular parallelepiped shape, and forms an external appearance of battery cell 100. Housing 120 includes: a case body 120A that accommodates an electrode assembly (not shown) and an electrolyte solution (not shown); and a sealing plate 120B that seals an opening of case body 120A. Sealing plate 120B is joined to case body 120A by welding.

Housing 120 has an upper surface 121, a lower surface 122, a first side surface 123, a second side surface 124, and two third side surfaces 125.

Upper surface 121 is a flat surface orthogonal to a Z axis direction (third direction) orthogonal to the Y axis direction and the X axis direction. Electrode terminals 110 are disposed on upper surface 121. Lower surface 122 faces upper surface 121 along the Z axis direction.

Each of first side surface 123 and second side surface 124 is constituted of a flat surface orthogonal to the Y axis direction. Each of first side surface 123 and second side surface 124 has the largest area among the areas of the plurality of side surfaces of housing 120. Each of first side surface 123 and second side surface 124 has a rectangular shape when viewed in the Y axis direction. Each of first side surface 123 and second side surface 124 has a rectangular shape in which the X axis direction corresponds to the long-side direction and the Z axis direction corresponds to the short-side direction when viewed in the Y axis direction.

A plurality of battery cells 100 are stacked such that first side surfaces 123 of battery cells 100, 100 adjacent to each other in the Y direction face each other and second side surfaces 124 of battery cells 100, 100 adjacent to each other in the Y axis direction face each other. Thus, positive electrode terminals 111 and negative electrode terminals 112 are alternately arranged in the Y axis direction in which the plurality of battery cells 100 are stacked.

Gas-discharge valve 130 is provided in upper surface 121. When the temperature of battery cell 100 is increased in an abnormal manner (thermal runaway) and internal pressure of housing 120 becomes more than or equal to a predetermined value due to gas generated inside housing 120, gas-discharge valve 130 discharges the gas to outside of housing 120.

Figure 2:
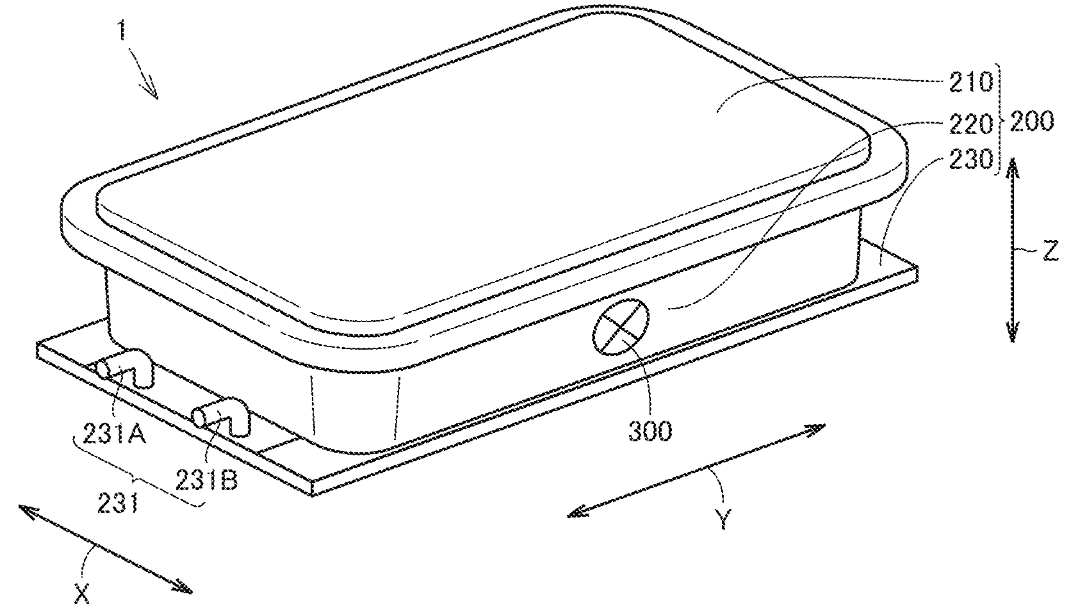
FIG. 2 is an external view of a case of the battery pack.

FIG. 2 is an external view of battery pack 1. As shown in FIG. 2, battery pack 1 includes a case 200. Case 200 includes a cover 210, a main body 220, and a cooling plate 230. Cooling plate 230 has a port 231 that communicates with a coolant path formed in cooling plate 230. Port 231 includes: an entrance portion 231A to the coolant path; and an exit portion 231B from the coolant path.

A safety valve 300 is provided in a side surface of main body 220. Safety valve 300 is normally in a valve-closed state, and is brought into a valve-opened state when the internal pressure is increased by gas discharged from battery cell 100.

Figure 3:
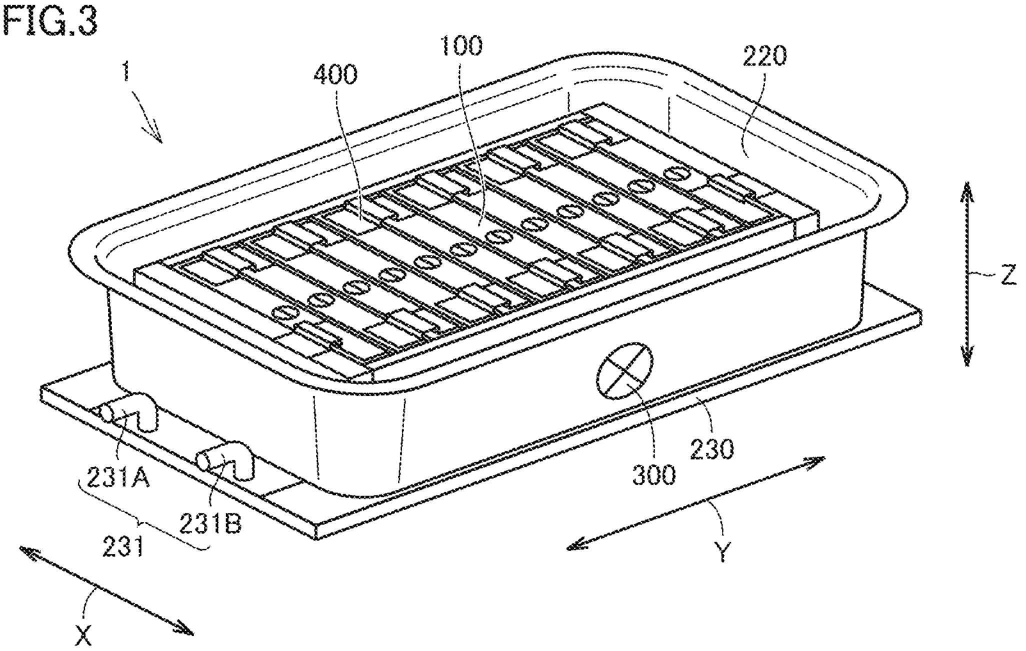
FIG. 3 is a perspective view showing inside of the case.
Figure 4:
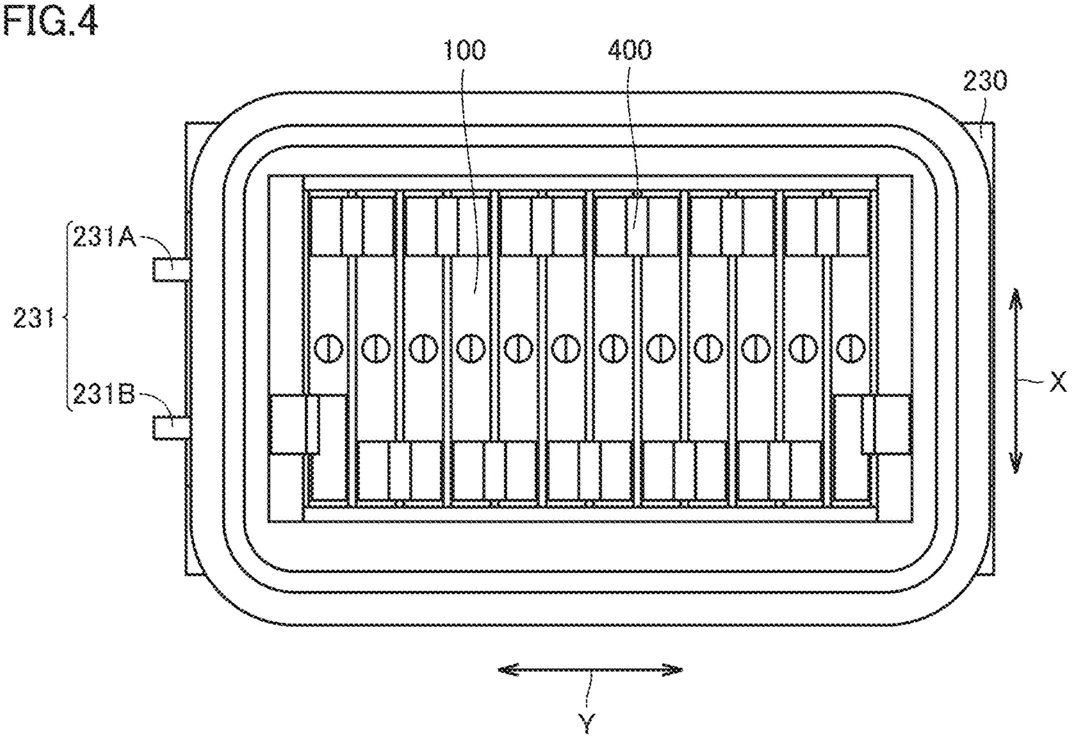
FIG. 4 is a top view showing the inside of the case.

FIG. 3 is a perspective view showing inside of case 200, and FIG. 4 is a top view showing inside of case 200. As shown in FIGS. 3 and 4, a battery module including a plurality of battery cells 100 is accommodated in an inner space of case 200. The plurality of battery cells 100 are accommodated in the inner space of case 200 with the plurality of battery cells 100 being restrained in the Y axis direction. The plurality of battery cells 100 are electrically connected together by bus bars 400. Each of bus bars 400 is electrically connected to a terminal (not shown) provided in case 200. Each of battery cells 100 is charged and discharged through the terminal (not shown).

Figure 5:
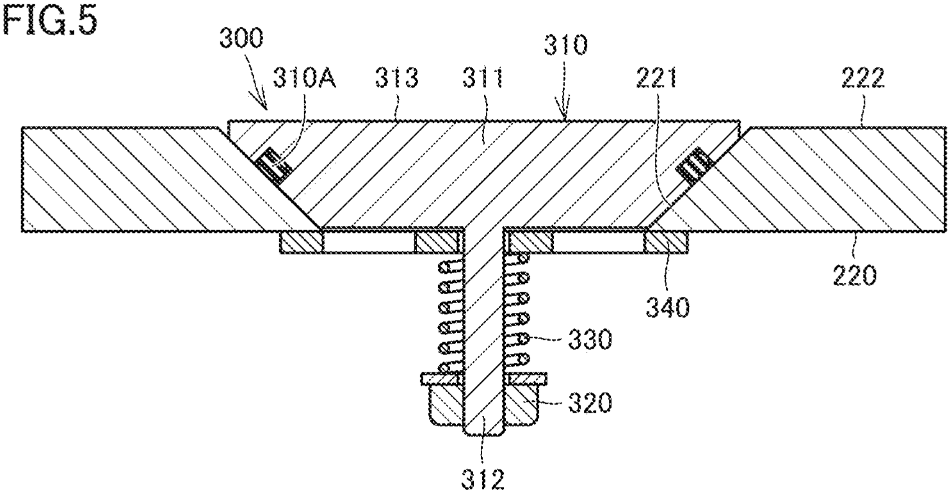
FIG. 5 is a cross sectional view showing a valve-closed state of an exemplary safety valve.
Figure 6:
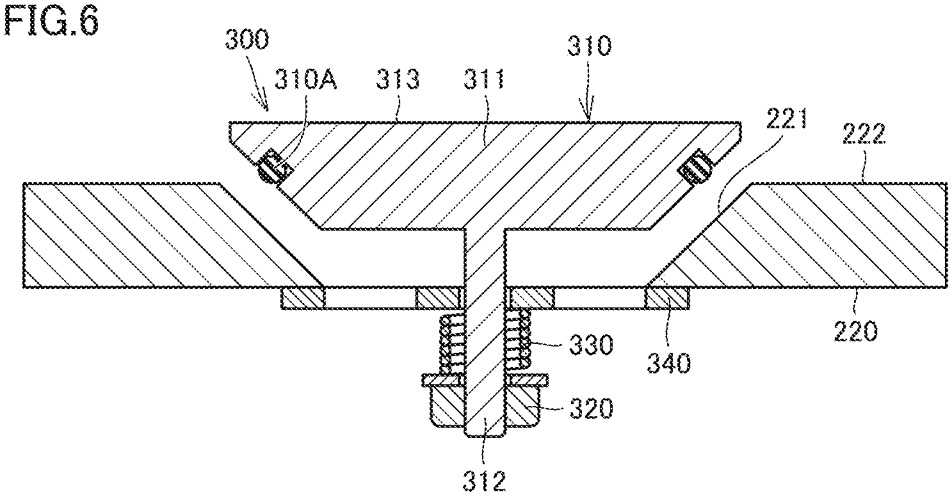
FIG. 6 is a cross sectional view showing a valve-opened state of the exemplary safety valve.

Each of FIGS. 5 and 6 is a cross sectional view showing an exemplary safety valve 300. FIG. 5 shows the valve-closed state, and FIG. 6 shows the valve-opened state.

As shown in FIGS. 5 and 6, safety valve 300 (valve structure) opens and closes an opening 221 having a substantially circular shape and provided in main body 220 of case 200. An inner peripheral surface of opening 221 has a tapered shape with a diameter increased toward the outer side of case 200.

Safety valve 300 includes a valve member 310, an adjustment screw 320, a biasing member 330, and a stopper 340.

Valve member 310 includes a valve body portion 311, a stem portion 312, and an outer surface 313. Valve body portion 311 is fitted to the inner peripheral surface of opening 221. Valve body portion 311 is provided such that outer surface 313 does not protrude on an outer side with respect to outer surface 222 of case 200 when safety valve 300 is closed (state shown in FIG. 5). A seal member 310A is provided on an outer periphery of valve body portion 311. Stem portion 312 protrudes from valve body portion 311 toward an inner side of case 200.

Adjustment screw 320 is screwed to a tip of stem portion 312. In the example of FIGS. 5 and 6, biasing member 330 is a coil spring provided on the outer periphery of stem portion 312. Stopper 340 is provided to be in abutment with an inner surface of main body 220 of case 200.

Biasing member 330 is provided between adjustment screw 320 and stopper 340. An amount of change in shape (length) of biasing member 330 can be adjusted by adjusting an amount of screwing of adjustment screw 320.

When the internal pressure of case 200 is increased, valve member 310 is moved to the outer side of case 200 so as to form a clearance (flow path) between the outer peripheral surface of valve body portion 311 and the inner peripheral surface of opening 221 as shown in FIG. 6. Thus, the gas in case 200 is discharged to the outside of case 200 and the internal pressure of case 200 can be decreased, with the result that case 200 can be prevented from being broken due to an excessive increase in pressure.

On this occasion, as shown in FIG. 6, biasing member 330 is compressed between adjustment screw 320 and stopper 340. Compressed biasing member 330 biases valve member 310 toward the inner side of case 200. By adjusting the amount of screwing of adjustment screw 320 in advance, it is possible to adjust biasing force by which biasing member 330 biases valve member 310 toward the inner side of case 200 in the valve-opened state shown in FIG. 6.

Figure 7:
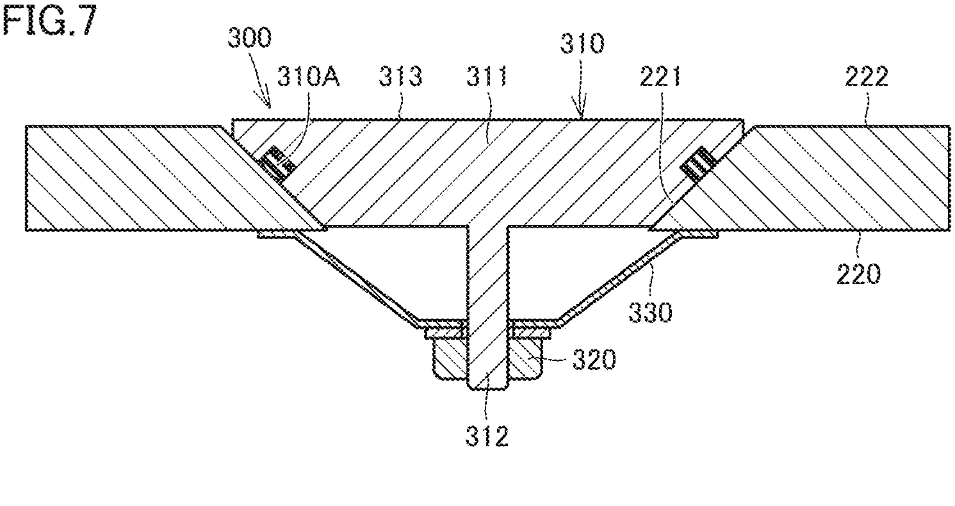
FIG. 7 is a cross sectional view showing a valve-closed state of a modification of the safety valve.
Figure 8:
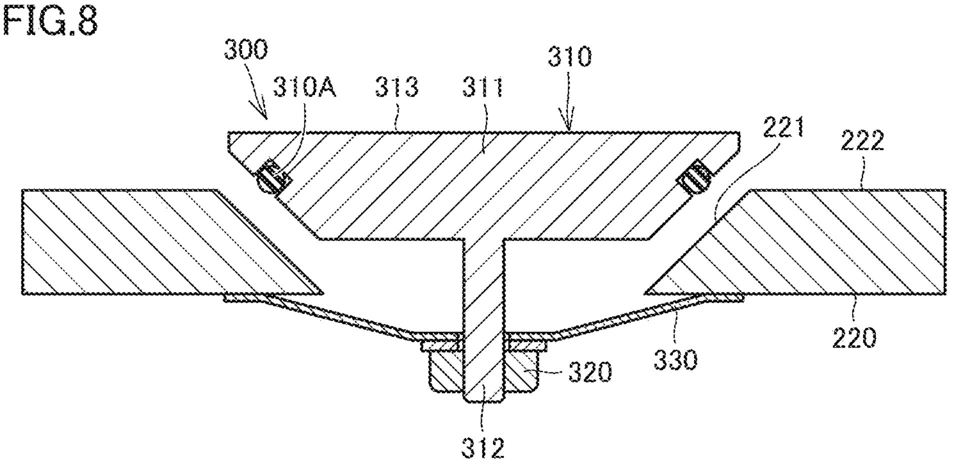
FIG. 8 is a cross sectional view showing a valve-opened state of the modification of the safety valve.

Each of FIGS. 7 and 8 is a cross sectional view showing a modification of safety valve 300. FIG. 7 shows the valve-closed state, and FIG. 8 shows the valve-opened state.

In the modification shown in FIGS. 7 and 8, instead of the coil spring shown in FIGS. 5 and 6, biasing member 330 is constituted of a plate spring. In this modification, stopper 340 is not provided.

Also in the modification shown in FIGS. 7 and 8, as with the example of FIGS. 5 and 6, when the internal pressure of case 200 is increased, valve member 310 is moved to the outer side of case 200 so as to form a clearance (flow path) between the outer peripheral surface of valve body portion 311 and the inner peripheral surface of opening 221 as shown in FIG. 8. On this occasion, biasing member 330 biases valve member 310 toward the inner side of case 200. By adjusting the amount of screwing of adjustment screw 320 in advance, it is possible to adjust biasing force by which biasing member 330 biases valve member 310 toward the inner side of case 200 in the valve-opened state shown in FIG. 8.

Figure 9:
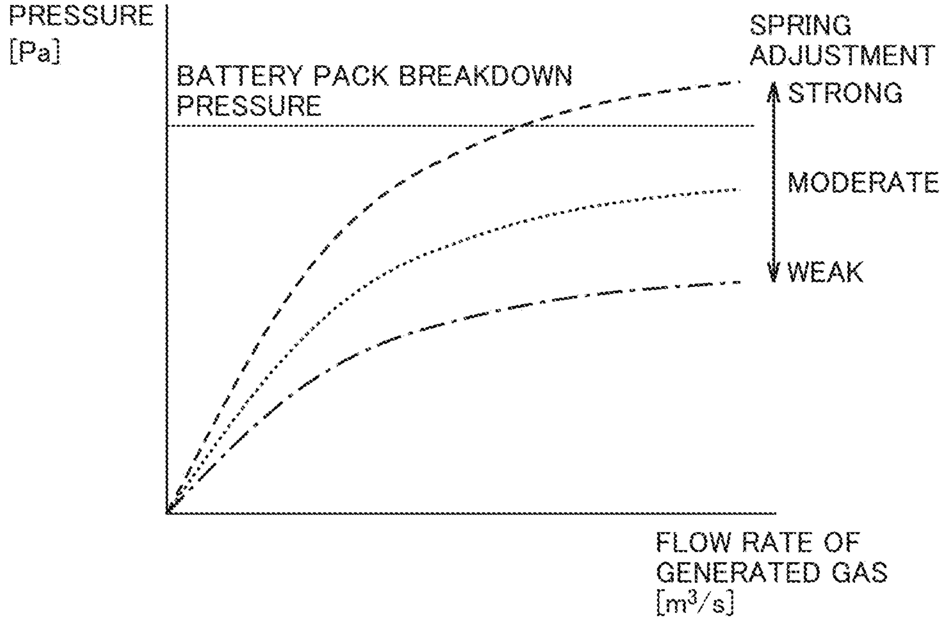
FIG. 9 is a diagram showing a relation between a flow rate of generated gas and a pressure inside the case.
Figure 10:
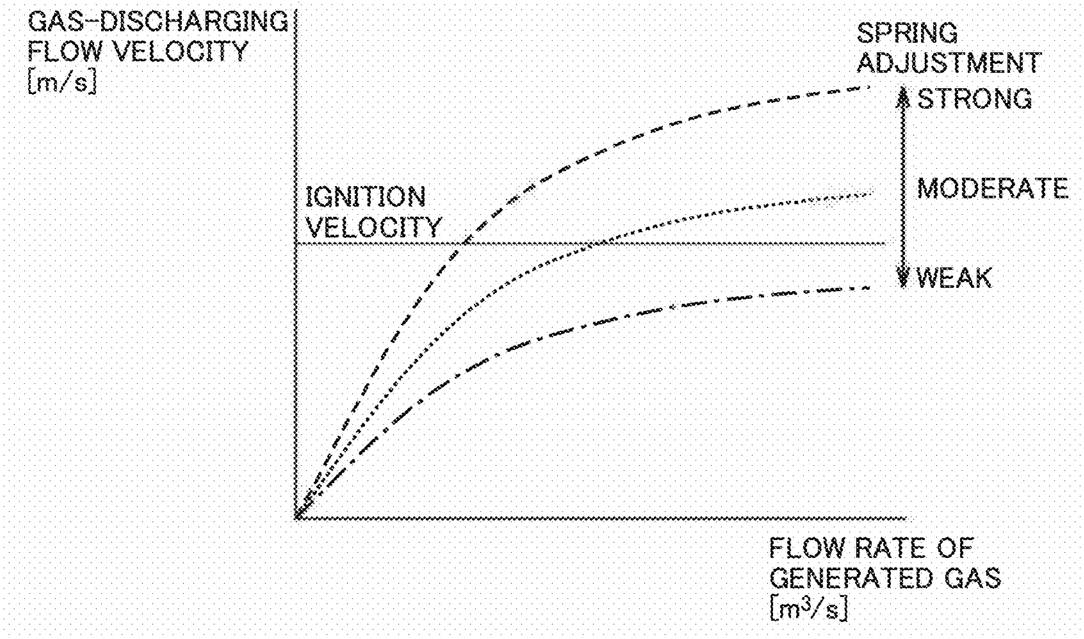
FIG. 10 is a diagram showing a relation between the flow rate of the generated gas and a gas-discharging flow velocity.

FIG. 9 is a diagram showing a relation between a flow rate of generated gas and a pressure inside the case. FIG. 10 is a diagram showing a relation between the flow rate of the generated gas and a gas-discharging flow velocity. “STRONG”, “MODERATE” and “WEAK” in FIGS. 9 and 10 each represent a strength of the biasing force by which biasing member 330 biases valve member 310 toward the inner side of case 200 when safety valve 300 is opened. The horizontal axis, "FLOW RATE OF GENERATED GAS", in FIGS. 9 and 10 represents an amount of gas generated in case 200. The vertical axis, "PRESSURE", in FIG. 9 represents the internal pressure of case 200. The vertical axis, "GAS-DISCHARGING FLOW VELOCITY", in FIG. 10 represents a flow velocity of ejected gas when the gas is discharged from safety valve 300.

In the case where the biasing force of biasing member 330 is "strong", when the flow rate of the generated gas is increased to increase the pressure, the internal pressure of case 200 may become more than a breakdown pressure ("BATTERY PACK BREAKDOWN PRESSURE" in FIG. 9) due to delay in opening safety valve 300 as shown in FIG. 9. This is not preferable from the viewpoint of protection of case 200.

In the case where the biasing force of biasing member 330 is "weak", when the flow rate of the generated gas is increased to discharge a large amount of gas from case 200, the flow velocity of the ejected gas may become less than a predetermined velocity ("IGNITION VELOCITY" in FIG. 10) due to the cross sectional area of the flow path of opening 221 being larger than necessary as shown in FIG. 10. This is not preferable from the viewpoint of prevention of ignition during discharging of gas.

In battery pack 1 according to the present embodiment, by adjusting the amount of screwing of adjustment screw 320 in advance, it is possible to adjust the biasing force by which biasing member 330 biases valve member 310 toward the inner side of case 200. Therefore, by such a simple operation, the biasing force of biasing member 330 can be precisely adjusted to the "moderate" state shown in FIGS. 9 and 10.

In the case where the biasing force of biasing member 330 is "moderate", even when the flow rate of the generated gas is increased to increase the pressure, the internal pressure of case 200 does not become more than the breakdown pressure ("BATTERY PACK BREAKDOWN PRESSURE" in FIG. 9). Further, as shown in FIG. 10, even when the flow rate of the generated gas is increased to discharge a large amount of gas from case 200, the cross sectional area of the flow path of opening 221 is suppressed from becoming too large, with the result that the flow velocity of the ejected gas does not become less than the predetermined velocity ("IGNITION VELOCITY" in FIG. 10).

Thus, according to battery pack 1 of the present embodiment, it is possible to perform highly reliable pressure adjustment and ejection velocity adjustment when the internal pressure of case 200 is increased.

Further, in each of the structures shown in FIGS. 5 to 8, biasing member 330 is provided inside case 200 and there is no structure that prevents the flow of the gas after the gas in case 200 passes through safety valve 300, thereby reducing a flow path resistance for the ejected gas and instantaneously discharging a large amount of the gas.

The structure of safety valve 300 according to the present embodiment is particularly effective when a battery cell 100 having high output and high capacity is used; however, characteristics of battery cell 100 are not limited in the present technology.

The gas discharged from battery cell 100 includes an ejected object of a material in the battery. As an example, a filter that can capture the ejected object from case 200 may be provided over opening 221. According to the structure of safety valve 300 of the present embodiment, clogging of the filter is suppressed, thus decreasing the internal pressure efficiently.

As an example, the cross sectional area of the flow path when safety valve 300 is opened is about 75 $mm^2$ or more and 7500 $mm^2$ or less. As an example, the diameter of opening 221 (the narrowest portion of the tapered shape) is about 20 mm or more and 100 mm or less. As an example, the spring constant of biasing member 330 is about 0.05 N/mm or more and 100 N/mm or less.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery pack comprising:
- a battery cell;
- a pack case that accommodates the battery cell and that is provided with an opening; and
- a valve structure provided to open and close the opening, wherein
- the valve structure includes a valve member having:
  - a valve body portion fitted to an inner peripheral surface of the opening,
  - a stem portion protruding from the valve body portion toward an inner side of the pack case,
  - an adjustment screw, wherein the adjustment screw is screwed to a tip of the stem portion, and
  - a biasing member provided inside the pack case, wherein a biasing force of the biasing member is adjustable by rotating the adjustment screw, the biasing member biases the valve member toward the inner side of the pack case using the biasing force when a clearance exists between an outer peripheral surface of the valve body portion and the inner peripheral surface of the opening, and
- when an internal pressure of the pack case is increased:
  - the valve member is moved to an outer side of the pack case so as to form the clearance between the outer peripheral surface of the valve body portion and the inner peripheral surface of the opening, and
  - the biasing member biases the valve member toward an inner side of the pack case.

2. The battery pack according to claim 1, wherein the battery cell is a lithium ion battery.

3. The battery pack according to claim 1, wherein the inner peripheral surface of the opening has a tapered shape with a diameter increased toward the outer side of the pack case.

4. The battery pack according to claim 1, wherein the valve member is provided not to protrude on the outer side with respect to an outer surface of the pack case when the valve structure is closed.

5. The battery pack according to claim 1, wherein
- the inner peripheral surface of the opening has a tapered shape with a diameter increased toward the outer side of the pack case, and
- the battery cell is a lithium ion battery.

6. The battery pack according to claim 1, wherein
- the valve member is provided not to protrude on the outer side with respect to an outer surface of the pack case when the valve structure is closed, and
- the battery cell is a lithium ion battery.

7. The battery pack according to claim 1, wherein the inner peripheral surface of the opening has a tapered shape with a diameter increased toward the outer side of the pack case, and the valve member is provided not to protrude on the outer side with respect to an outer surface of the pack case when the valve structure is closed.

8. The battery pack according to claim 1, wherein the inner peripheral surface of the opening has a tapered shape with a diameter increased toward the outer side of the pack case, the valve member is provided not to protrude on the outer side with respect to an outer surface of the pack case when the valve structure is closed, and the battery cell is a lithium ion battery.

* * * * *